May 5, 1970     W. R. REYNOLDS ET AL     3,509,768

TURBINE INLET AVERAGE TEMPERATURE SYSTEM

Filed Oct. 12, 1967     2 Sheets-Sheet 1

$$E_{out} = \frac{-R_O}{R_1}\left[E_1 + E_2 + \cdots E_n\right]$$

$$E_{out} = \begin{cases} 0 \text{ when } E_{in} > 0 \\ 10v. \text{ when } E_{in} < 0 \end{cases}$$

$$E_{out} = \begin{cases} 0 \text{ when } E_{tc} > E_{av} - E_o \\ +10v. \text{ when } E_{tc} < E_{av} - E_o \end{cases}$$

INVENTORS
WILLIAM R. REYNOLDS
JOHN R. TUCKER

BY Herschel C. Omohundro

ATTORNEY

May 5, 1970     W. R. REYNOLDS ET AL     3,509,768
TURBINE INLET AVERAGE TEMPERATURE SYSTEM
Filed Oct. 12, 1967     2 Sheets-Sheet 2

INVENTORS
WILLIAM R. REYNOLDS
JOHN R. TUCKER
BY
Herschel C. Omohundro
ATTORNEY

United States Patent Office 3,509,768
Patented May 5, 1970

3,509,768
TURBINE INLET AVERAGE TEMPERATURE SYSTEM
William R. Reynolds, Manhattan Beach, Calif., and John R. Tucker, Cambridge, Mass., assignors to The Garrett Corporation, Los Angeles, Calif., a corporation of California
Filed Oct. 12, 1967, Ser. No. 674,872
Int. Cl. G01k 7/14
U.S. Cl. 73—341                                     5 Claims

ABSTRACT OF THE DISCLOSURE

Apparatus to determine a turbine inlet average temperature. It has a plurality of thermocouples embedded in stator vanes spaced around the inlet to the turbine wheel. Leads from the thermocouples extend to temperature compensated cold reference junctions connected in an electronic system having a relay for each thermocouple which relay is activated to disconnect the thermocouple from the system in the event of failure of the thermocouple. The system includes an adder to which signals from the thermocouples are fed to be averaged and amplified, the resulting amplified signal then being supplied to a meter to indicate the average inlet temperature. The relay means is such as to prevent the reconnection of rejected thermocouples to the system. As an alternative or addition to the system, a fuel control element could be substituted for the meter or added to the system and made responsive to the average signal supplied by the adder to control engine operation.

Summary

This invention relates generally to gas turbine engines but is more particularly directed to instrumentation provided in connection with such engines to indicate certain conditions of operation obtaining during the use thereof.

Still more particularly, the invention relates to a method of and apparatus for sensing the temperatures of the driving gases at various places in the inlet to the turbine, averaging the temperatures so sensed, and supplying a signal proportional to such average to either an indicator, a control device, or both.

An object of the invention is to provide apparatus for determining the average temperature in the inlet of a gas turbine, the apparatus having a plurality of thermocouples located at points spaced circumferentially around the inlet passage and connected in an electronic system provided with a reference junction for each thermocouple, a relay for selectively disconnecting each thermocouple from the system, means for adding, averaging and amplifying the signals transmitted by the thermocouples, and impressing the average signal on a meter to indicate the average temperature in the inlet, the electronic system also having means for comparing the signals from the individual thermocouples with the average or some other predetermined temperature to determine whether the individual thermocouples or their connecting lines are functioning properly, and if not, to operate a respective relay to disconnect the defective thermocouple from the system and lock or otherwise maintain it in the disconnected condition.

Still another object is to provide the system mentioned in the two preceding paragraphs with means for indicating which of the thermocouples have failed and been disconnected from the system to facilitate the repair and/or replacement thereof.

A further object is to embed the thermocouples in the nozzle vanes of the turbine inlet adjacent to the leading edges thereof whereby the thermocouples will, in effect, become an integral part of the nozzle vane and be subjected to the temepratures of the gases but be protected from solid foreign materials entrained in such gases or any accumulation of deposits thereon by the gases. The manner of mounting the thermocouples will not increase the frontal area of the nozzle blades or otherwise affect gas flow.

It is a still further object of the invention to locate the thermocouples at points spaced circumferentially of the inlet and also at different radial distances from the axial center thereof in a modification of the invention so that a more accurate average of potentially stratified or localized gas temperatures will be secured.

A more complete understanding of the invention and its objects will be made apparent by the following specific description and the accompanying drawings of one form of the invention.

The drawings

Description

Figure 1:
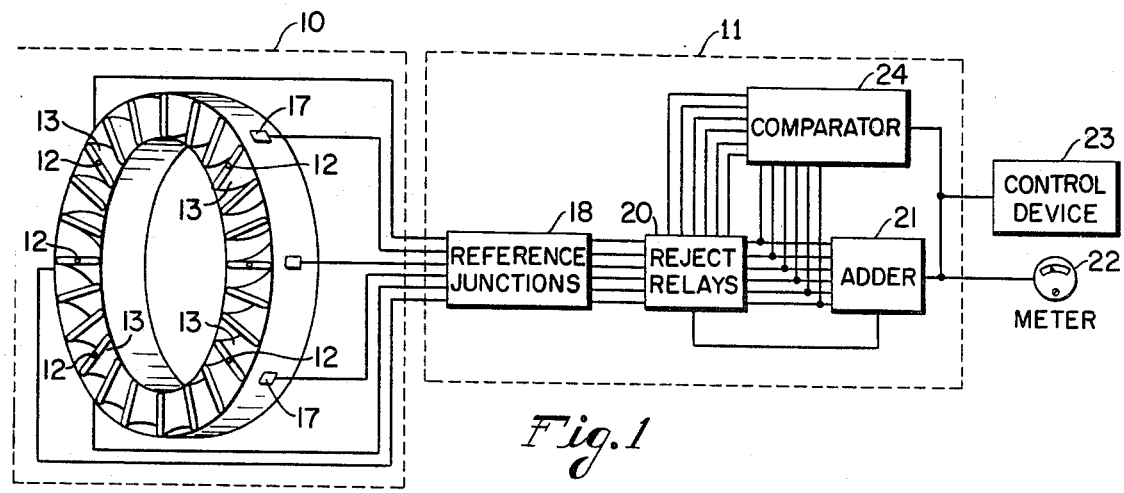
FIG. 1 is a schematic block diagram showing a system embodying the present invention.

Particular reference to FIG. 1 of the drawings discloses that the system of the present invention includes generally two parts: first, a basic transducer 10; and second, an electronic translation system indicated generally by the numeral 11. The transducer 10 is composed of a multiplicity of substantially identical thermocouples 12 which may be of any suitable type commercially available, type K Chromel-Alumel couples having been found satisfactory when a maximum engine temperature of 1800° F. is not exceeded.

Figure 5:
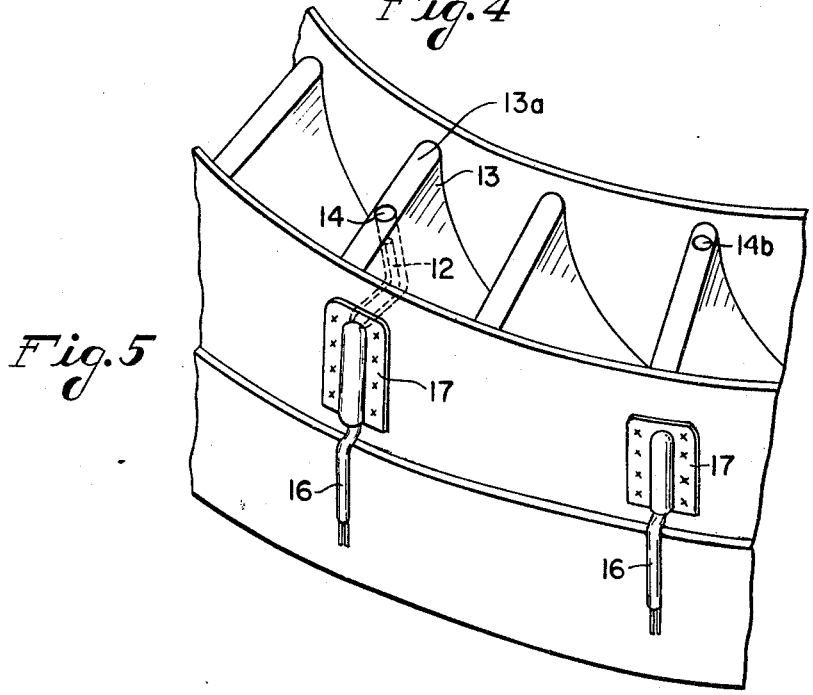
FIG. 5 is a perspective view of a portion of a turbine inlet nozzle illustrating the manner of embedding a thermocouple therein in accordance with the present invention.
Figure 6:
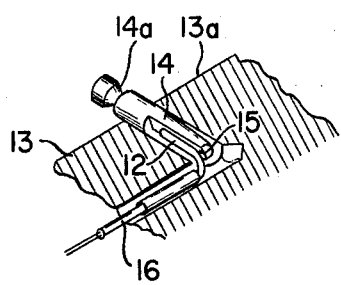
FIG. 6 is a sectional view taken through an inlet nozzle vane during the process of embedding a thermocouple therein.

The thermocouples 12 are embedded in the stator vanes 13 at the inlet of the turbine. As shown in FIGS. 1, 5 and 6, holes may be drilled into certain vanes spaced circumferentially around the inlet stator. In one installation holes were drilled into the selected vanes from the outer periphery of the stator and cross drillings were then made from the leading edges of the blades, to intersect the first holes. Tapered pins 14 (see FIG. 6) were then turned from weld rod, these pins being made of predetermined length and provided at a certain point with a breakoff notch 14a to facilitate assembly. Such pins are relieved on one side as at 15 (see FIG. 6). A thermocouple 12 is then spot welded to the relieved side of the pin at a point to be disposed a predetermined distance, i.e., .050 in. from the leading edge 13a of the vane when the pin is positioned therein. The lead 16 of the thermocouple is then passed through the holes in the vane from the leading edge to the outer periphery after which the tapered pin 14 is inserted and driven into the hole in the vane leading edge. The continuity of the lead and thermocouple may then be checked after which the installation may be made permanent by filling in the area around the lead with a ceramic plastic composition such as that sold under the trademark "Astroceram." The lead 16 may be bent to extend alongside the outer wall of the stator body, as illustrated in FIG. 5, and retained in place by a plate 17 spot welded to the stator. The outer end of the pin 14 may be broken off at the notch 14a and the pin welded in place at the vane leading edge. If desired, the leading edge may be hand-finished to eliminate roughness and facilitate gas flow thereover. Suitable checks should be made periodically during the assembly and at the conclusion for continuity and operation of the thermocouple. It will be apparent at this time that the thermocouples are suitably spaced circumferentially around the stator, and if desired, may also be disposed at different radial distances from the axial center of the stator as shown by the positions of pins 14 and 14b in FIG. 5 to insure suitable sensing of the gas temperatures completely around the annular inlet to the turbine.

The leads 16 of the various thermocouples are connected with the electronic translation system 11. This system includes a reference or cold junction for each thermocouple, such junctions being indicated by a block 18 in the system diagram of FIG. 1. The reference junctions are exposed to the ambient atmosphere and electronically compensated for changes in temperature at the cold junction. This electronic compensation can be accomplished in a manner similar to that shown in Pat. No. 1,327,800 to Beighlee and No. 1,982,053 to Hodgson et al. They reference each couple to a preset level (usually 0° C.). The leads from the reference junctions are each provided with a relay, collectively designated in FIG. 1 by the block 20, which may be operated to disconnect any respective individual thermocouple from the system upon failure of such couple.

The system 11 is provided with an adder 21 having a suitable operational amplifier, to which the leads from the relays are connected. This adder averages the outputs of the thermocouples and amplifies such average to drive a meter 22 or other suitable indicating device. The meter 22 is calibrated to show the average temperature in accordance with the signal transmitted thereto. If desired, the signal may alternatively, or in addition, be applied to a control device 23 to govern engine operation.

Figure 4:
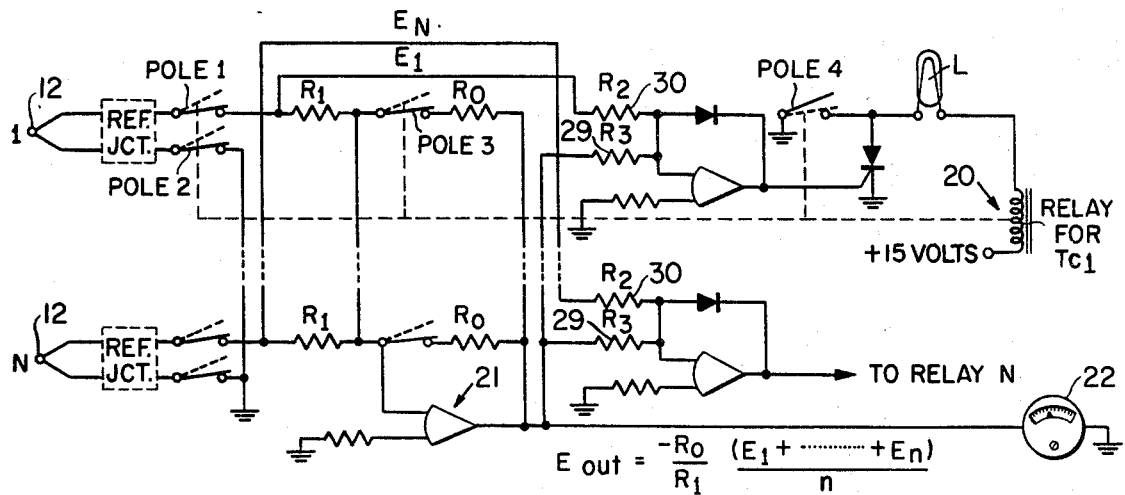
FIG. 4 is a diagrammatic view of the system shown in FIG. 1 having a relay for each thermocouple employed in the system to reject or disconnect malfunctioning thermocouples from the system.

To minimize failure of the system, it is provided, as shown in FIGS. 1 and 4, with a comparator device designated generally in FIG. 1 by the numeral 24, having means for comparing the signal from each thermocouple with the average determined by the adder 21.

If a thermocouple should fail, due to shorting out or its circuit being opened for any reason, causing its output to fall below the average of all the couples by a predetermined amount (for example 150° F.), the comparator will excite the corresponding relay 20 and cause it to disconnect the respective thermocouple from the system. The disconnected positions of the switches of the relay are indicated by dotted lines in FIG. 4. Suitable types of relays may be provided, one being a 4-pole double throw with functions of poles 1, 2 and 3 being to open the circuit couple and change gain, as shown in FIG. 4. The function of pole 4 is to latch the relay in circuit opening condition. As shown in FIG. 4, the circuit for the relay latching function is provided with a signal lamp L which will be illuminated when pole 4 is actuated to a circuit closing position. The lighted lamp indicates that its respective thermocouple has been disconnected. As pointed out elsewhere herein, the circuit of FIG. 4 requires a relay for each thermocouple.

The adder 21 is so constructed that when a thermocouple is disconnected from the system, the gain of the adder is increased to maintain a system output proportional to the average of the outputs of the remaining thermocouples.

Figure 2:
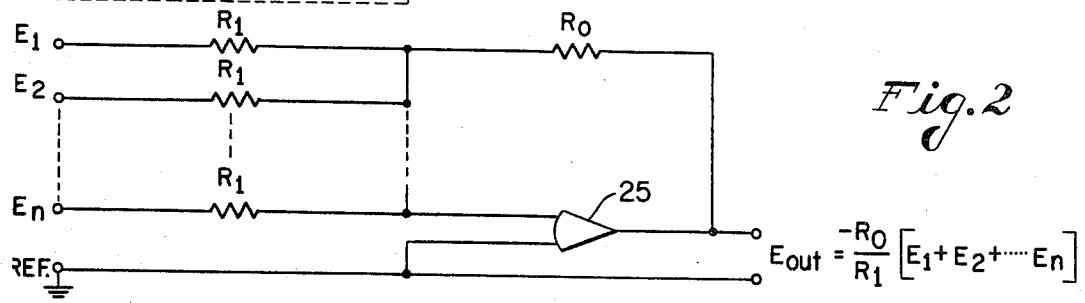
FIG. 2 is a diagrammatic view exemplifying an adder circuit which may be used in the system shown in FIG. 1.

FIG. 2 shows diagrammatically the adder circuit employed in the system 11 of FIG. 1. This adder has a high-grade temperature stable, operational amplifier 25 to which signals from all the thermocouples are applied. The adder has a feedback resistor $R_0$ and a resistor $R_1$ for each of the inputs $E_{1, 2, 3}$, from the thermocouples. This arrangement provides an output $$E_{out} = \frac{-R_0}{R_1}(E_1 + E_2 + \ldots E_n)$$

from the adder which constitutes the average of the millivolt inputs of all the thermocouples amplified into volts suitable for driving any type of readout device. Use of precision resistors and operational amplifiers now available results in an average of extreme accuracy.

Figure 3:
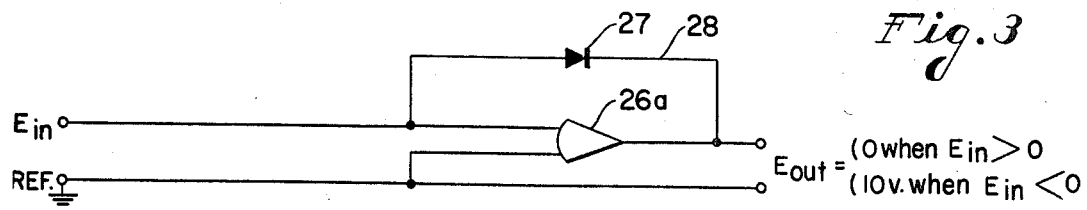
FIG. 3 is a diagrammatic view of the basic circuit of an operational amplifier forming a part of a comparator used in the system shown in FIG. 1.

FIG. 3 shows diagrammatically a basic comparator circuit forming a part of the system 11 of FIG. 1. This comparator also makes use of an operational amplifier 26a with a diode 27 in the feedback line 28. One input to the amplifier is connected with the ground, designated "REF." The feedback line 28, which contains the diode 27, is connected with the input $E_{in}$. The relation between the input and output of this configuration may be expressed approximately in the following manner:

$$E_{out} = \begin{cases} 0 \text{ when } E_{in} > 0 \\ 10 \text{ v. when } E_{in} < 0 \end{cases}$$

Figure 3A:
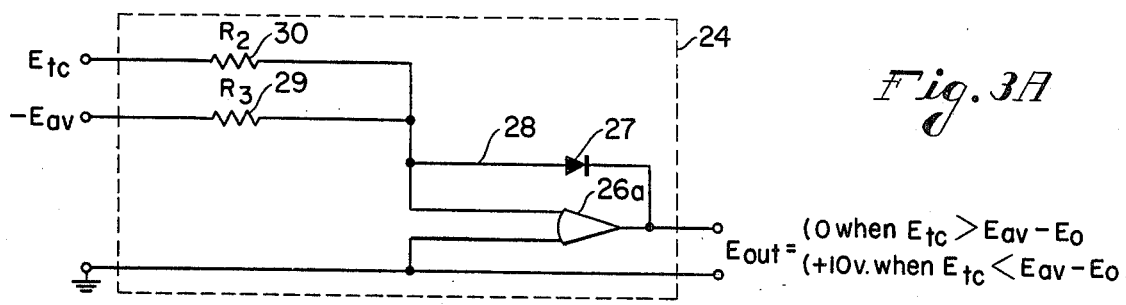
FIG. 3A is a similar view of a comparator circuit which may be used in the system shown in FIG. 1.

This property of the comparator is utilized as shown in FIG. 3A.

In FIG. 3A, a resistor 29 is disposed in the input line which receives the average signal from the adder and a second resistor 30 is connected in the input line from the respective thermocouples. The comparator input then becomes the center tap of a simple voltage bridge between the incoming thermocouple and the adder output. Since the adder output is inverted, this bridge can be adjusted so that $E_{in}$ is very nearl zero, say +3.3 mv. under normal circumstances. Then, if the output of the couple being monitored were to fall by more than 3.3 mv. below average, $E_{in}$ would fall below zero and the comparator would energize the respective reject relay, the relation between the input and output being expressed approximately by the following relation:

$$E_{out} = \begin{cases} 0 \text{ when } E_{tc} > E_{av} - E_o \\ +10 \text{ v. when } E_{tc} < E_{av} - E_o \end{cases}$$

This operation would disconnect the malfuctioning thermocouple from the system. The figure 3.3 mv. (the value of $E_o$ in the above equation) was selected because it corresponds to a drop of 150° F. for a Chromel-Alumel couple; any desired rejection level may be used. In this form of the invention, a comparator 24 with an amplifier, diode, resistors, and connections, will be supplied for each thermocouple and the monitoring of the thermocouples and their circuits will be continuous. It may be found desirable to selectively monitor the individual thermocouples instead of continuously monitoring them, and if so, a modified comparator circuit may be provided. In such circuit, the input lines from the various thermocouples may be connected to a suitable sampling switch by which the individual thermocouples can be successively or selectively connected with the input line of the same comparator circuit. The sampling switch may be connected with a reject relay which is operative upon receipt of a signal pulse from the comparator to disconnect the respective thermocouple from the electronic system. The operations of the two comparator circuits are essentially identical.

We claim:
1. Apparatus for determining turbine inlet average temperature, comprising:
 (a) a plurality of thermocouples embedded in the leading edges of a plurality of nozzle vanes spaced circumferentially around the turbine inlet;

(b) electronic means having an amplifier in circuit with said thermocouples and operative to provide an amplified output signal proportional to the average temperature of all the said couples; and (c) means in circuit with said electronic means for monitoring and disconnecting from the circuit any of said thermocouples that fails to function properly.

2. Apparatus for determining turbine inlet average temperature as set forth in claim 1 in which means are provided for indicating which of said thermocouples has been so disconnected.

3. Apparatus for determining turbine inlet average temperature, comprising:

(a) a plurality of thermocouples embedded in the leading edges of a plurality of nozzle vanes spaced circumferentially around the turbine inlet;

(b) electronic means having an amplifier in circuit with said thermocouples and operative to provide an amplified output signal proportional to the average temperature of all the said couples; and (c) reference junctions in said circuit which compensate for changes in temperature at the cold junction and reference each thermocouple to a preset level, said circuit also having means for comparing each thermocouple with the average of all thermocouples and disconnecting from said circuit any thermocouple falling a predetermined amount below such average.

4. Apparatus for determining turbine inlet average temperature as set forth in claim 3 in which the said thermocouples are also disposed at different radial distances from the center of said turbine inlet relative to one another.

5. Apparatus for determining turbine inlet average temperature as set forth in claim 3 in which said thermocouples are carried by pins inserted in the leading edges of circumferentially spaced inlet vanes at points located different distances from the axial center of said turbine inlet.

References Cited

UNITED STATES PATENTS

| 2,875,613 | 3/1959 | Neal | 73—341 |
| 2,911,831 | 11/1959 | Davies | 73—343 |
| 2,996,916 | 8/1961 | Smith | 73—346 |
| 3,348,414 | 10/1967 | Waters | 73—343 |
| 1,327,800 | 1/1920 | Beighlee | 73—361 |
| 1,982,053 | 11/1934 | Hodgson et al. | 73—361 |

FOREIGN PATENTS 154,688 10/1963 U.S.S.R.

S. CLEMENT SWISHER, Primary Examiner

D. E. CORR, Assistant Examiner

U.S. Cl. X.R.

73—346, 349, 361